Oct. 27, 1953

K. C. CUMMINGS 2,656,977

FUEL DURATION COMPUTER

Filed April 1, 1950

Inventor
KIMBALL C. CUMMINGS
By
George H Fisher
Attorney

Oct. 27, 1953  K. C. CUMMINGS  2,656,977
FUEL DURATION COMPUTER
Filed April 1, 1950
2 Sheets-Sheet 2

Inventor
KIMBALL C. CUMMINGS
By George H Fisher
Attorney

Patented Oct. 27, 1953

2,656,977

UNITED STATES PATENT OFFICE 2,656,977

FUEL DURATION COMPUTER

Kimball C. Cummings, Minneapolis, Minn., assignor to Minneapolis-Honeywell Regulator Company, Minneapolis, Minn., a corporation of Delaware Application April 1, 1950, Serial No. 153,421

14 Claims. (Cl. 235—61)

This invention is concerned with a fuel duration computer and is particularly adapted for use on aircraft.

In both military and commercial aircraft of the present day, devices for indicating the quantity of fuel remaining in the tanks are universally used. Vast improvements have been made in these devices so that now it is possible to indicate with great accuracy the pounds of fuel, rather than the number of gallons, remaining in the tanks. With these devices, however, the pilot, flight engineer or other personnel must determine from mathematical tables, additional instruments, or by mental guesswork the rate at which the fuel is being used. From the pounds of fuel remaining and rate indications further mental computations are necessary to find out how much longer the fuel will last. Because such manner of determining the duration of the fuel is necessarily inefficient, aircraft are required to carry a substantial quantity of fuel in addition to the estimated quantity required to arrive at the destination.

The present invention therefore has as one of its main objects the computing, by electronic and mechanical means, of the length of time the fuel will last.

A further object of the invention is to design such computing apparatus as will operate rapidly and with great accuracy.

Another object of the invention is to design a fuel duration computer which can receive the indications of fuel quantity and fuel flow directly from the measuring apparatus and thus does not require a human operator to insert the signals manually.

Another object of the invention is to design such computing apparatus as will operate continuously and immediately react to changes in the fuel quantity and rate of fuel flow to give a continuous and instantaneous indication of the length of time the craft can continue to remain airborne on the amount of fuel remaining in the tanks if the fuel continues to be used at the rate then operating the computer.

Another object of the invention is to design computing apparatus the accuracy of which will not be affected by changes in temperature.

Such a computer as constitutes the present invention enables an operator to quickly, easily and efficiently control the engines to obtain the maximum economy of flight. The supply of fuel carried by the craft as insurance may thus be substantially reduced to either carry a greater pay load by reducing the total amount of fuel carried or to increase the range of the craft.

The computer as designed compares a voltage representing the total quantity of fuel with a portion of a voltage representing the total rate of flow of the fuel to control a motor. The motor in turn controls the portion of the rate of flow voltage compared and thus gives an indication of the length of time the fuel will last. The computer thus solves the equation $$Q = \frac{dq}{dt} T$$

where $Q$ represents the quantity of fuel in the tank or tanks;

$$\frac{dq}{dt}$$

represents the total rate at which the fuel leaves the tank or tanks; and $T$ represents the length of time the fuel will last.

For a better understanding of the invention reference is had to the following description, taken in conjunction with the accompanying drawings, in which.

Figure 1:
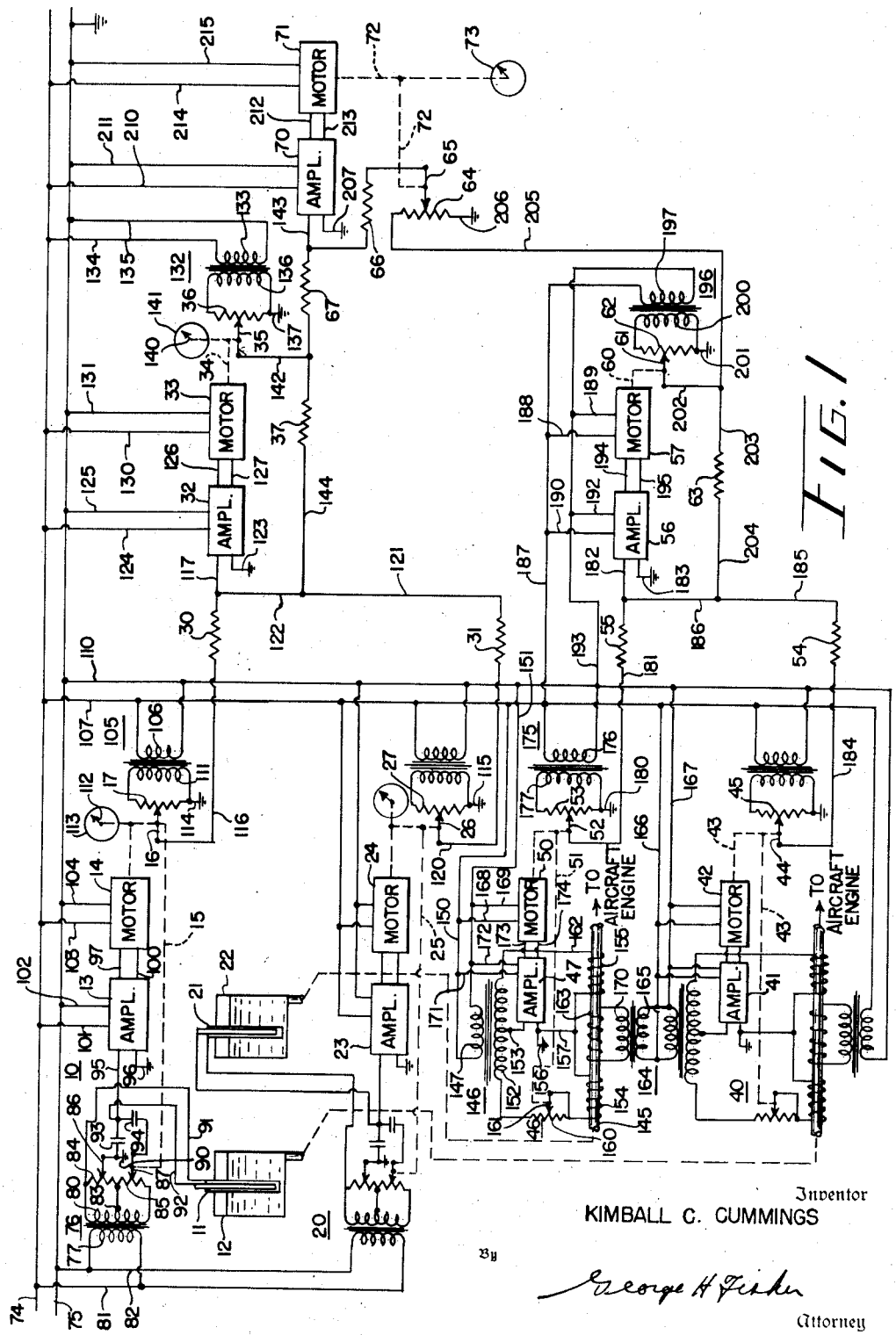
Figure 1 is an illustration of one means of using the invention.

In the circuit shown in Figure 1, the signal voltage representing the fuel quantity in one of the fuel tanks is obtained from a bridge 10. One arm of the bridge comprises a capacitor 11, the capacitance of which is determined by the quantity of fuel in a tank 12. The output voltage of the bridge 10 energizes an amplifier 13, which in turn operates upon a motor 14 to cause operation of the motor upon unbalance of the bridge 10. A mechanical output 15 of the motor is sent back to bridge 10 for rebalancing purposes. The mechanical output of motor 14 further moves a wiper arm 16 along a potentiometer 17.

A second bridge 20 has as one arm thereof a second capacitor 21 in a second tank 22 to provide a second signal voltage indicative of the quantity of fuel in the second tank. The output voltage of bridge 20 operates upon an amplifier 23 to energize a motor 24. The mechanical output 25 of motor 24 operates to rebalance bridge 20 and further moves a wiper arm 26 along a potentiometer 27.

The output voltages of potentiometers 17 and 27 are thus each indicative of the quantities of fuel in the tanks 12 and 22. The output voltages of these two potentiometers are added together through summing resistors 30 and 31 and impressed on the input circuit of an amplifier 32. Amplifier 32 controls the operation of a motor 33 having a mechanical output 34 which controls a wiper arm 35 along a potentiometer 36. The output voltage of potentiometer 36 is representative of the total quantity of fuel in the two tanks. It is understood of course that more than two fuel quantity capacitors such as capacitors 11 and 21 may be used if there are more than two tanks or if it is desired to put more than one capacitor in each tank. Similarly, only one can be used if there is but one tank. All that is necessary is to provide a separate bridge, amplifier, motor and potentiometer to obtain a signal voltage to be added to the other signal voltages and impressed on the input circuit of amplifier 32.

The output voltage of potentiometer 36 is impressed on the input circuit of amplifier 32 through a summing resistor 37 for rebalancing purposes.

The rate of flow of the fuel from tank 12 may be indicated by a flow meter 40, the output voltage of which energizes an amplifier 41. The amplifier in turn controls the operation of a motor 42 which has a mechanical output 43 for rebalancing the flow meter 40. The mechanical output 43 of the motor also operates a wiper arm 44 along a potentiometer 45.

The rate of flow of fuel from tank 22 may be indicated by a flow meter 46, the voltage output of which energizes an amplifier 47. Amplifier 47 controls the operation of a motor 50 which has a mechanical output 51 for rebalancing the flow meter circuit. The mechanical output 51 of motor 50 also operates a wiper arm 52 along a potentiometer 53.

The output voltages of potentiometers 45 and 53 are thus indicative of the rates of flow of the fuel from the two tanks 12 and 22. These voltages are added together through summing resistors 54 and 55 and impressed upon the input circuit of an amplifier 56. Amplifier 56 controls the operation of a motor 57 which has a mechanical output 60 which operates a wiper arm 61 along a potentiometer 62. The output voltage of potentiometer 62 is thus an indication of the total rate of flow of the fuel from the tanks. The output voltage from potentiometer 62 is fed back through a resistor 63 to the input circuit of amplifier 56 to provide a rebalancing action.

The output voltage of potentiometer 62 is further impressed across a second potentiometer 64 which has a wiper arm 65 cooperating therewith. The output voltages of potentiometers 64 and 36 are added algebraically through summing resistors 66 and 67 respectively. The resultant voltage is then impressed upon the input circuit of an amplifier 70 to control the operation of a motor 71. Motor 71 has a mechanical output 72 which controls the movement of wiper arm 65 along potentiometer 64 to control the portion of the voltage across potentiometer 64 which is compared with the output voltage of potentiometer 36, representing the total quantity of fuel. The mechanical output 72 of motor 71 further moves an indicator pointer along a dial 73 which may be calibrated to indicate the length of time the fuel will last if it continues to be used at its present instantaneous rate.

The bridges, flowmeters, amplifiers, motors and potentiometers, with the exception of potentiometer 64, may all be energized from a pair of power leads 74 and 75, such transformers as necessary being used.

Bridges 10 and 20 may be essentially the same as shown in a Schafer et al. Patent 2,563,280 assigned to the same assignee as the present invention. Bridge 10 is energized by a transformer 76 having a primary 77 and a secondary 80. Primary 77 is connected to power leads 74 and 75 through conductors 81 and 82. Transformer secondary 80 has a center tap 83.

A resistor 84 is connected between the upper terminal of transformer secondary 80 and center tap 83 while a second resistor 85 is connected between the lower terminal of transformer secondary 80 and center tap 83. A wiper arm 86, connected to ground terminal 90, cooperates with resistor 84 while a wiper arm 87 cooperates with resistor 85.

The fuel gage capacitor 11 has one plate connected to the upper terminal of transformer secondary 80 by means of conductor 91 while the other plate of the capacitor 11 is connected by means of conductor 92 to one plate of a capacitor 93, the other plate of which is connected to ground terminal 90. A capacitor 94 has one plate connected to wiper arm 87 and has the other plate connected to the ungrounded plate of capacitor 93. The output voltage of bridge 10 is taken from across capacitor 93.

Wiper arm 86 is for the purpose of empty calibration. That is, when the tank 12 is empty the wiper arm 86 is manually moved until the bridge is balanced and there is no output voltage.

The wiper arm 87 is moved by motor 14 through mechanical connection 15 to maintain the ratio of the value of resistor 84 between the wiper arm 86 and the upper terminal of transformer secondary 80 to the value of resistors 84 and 85 between wiper arms 86 and 87 equal to the ratio of the capacitance of capacitor 11 to the capacitance of capacitor 94. When this ratio is satisfied there is no voltage drop across capacitor 93 and thus no output voltage from bridge 10.

The ungrounded plate of capacitor 93 is connected to amplifier 13 through conductor 95 with the other input terminal to amplifier 13 being connected to ground terminal 96. Amplifier 13 is connected to motor 14 through conductors 97 and 100. Amplifier 13 is connected to power leads 74 and 75 through conductors 101 and 102 while motor 14 is connected to power leads 74 and 75 through conductors 103 and 104. Amplifier 13 and motor 14 may be of the type shown and described in the Upton Patent 2,423,534, which issued July 8, 1947, and is assigned to the same assignee as the present invention.

Potentiometer 17 is energized by transformer 105 having a primary 106, which is connected to power leads 74 and 75 by conductors 107 and 110. Transformer 105 further has a secondary 111 which is connected across potentiometer 17. As stated previously, operation of motor 14 results in movement of wiper arm 16 along potentiometer 17 to control the output voltage of potentiometer 17 in accordance with the quantity of fuel in the fuel tank 12. Motor 14 further moves wiper arm 87 along resistor 85 in bridge 10 to rebalance the bridge by adjusting the ratios of the resistors so that they are equal to the ratio of the capacitors. Thus, as long as the quantity of fuel in the tank remains constant there is no output voltage from the bridge and thus no energization of the amplifier or operation of the motor and the voltage output from potentiometer 17 remains constant.

If desired, motor 14 may also control the movement of an indicator arm 112 across a dial 113 to give an indication of the quantity of fuel in the tank 12.

Because the circuit of bridge 20, amplifier 23, motor 24 and potentiometer 27 are identical with the circuit of bridge 10, amplifier 13, motor 14 and potentiometer 17 a discussion of the description and operation of the circuit of bridge 20, amplifier 23, motor 24 and potentiometer 27 is unnecessary.

The lower terminal of potentiometer 17 is connected to ground terminal 114 while the lower terminal of potentiometer 27 is connected to ground terminal 115.

The output voltage from potentiometer 17 is connected to amplifier 32 through conductor 116, summing resistor 30 and conductor 117. The output voltage of potentiometer 27 is connected to amplifier 32 through conductor 120, summing resistor 31, and conductors 121, 122 and 117. The other input terminal to amplifier 32 is connected to ground terminal 123. Amplifier 32 is energized from power leads 74 and 75 by conductors 124 and 125.

Amplifier 32 is connected to motor 33 and energizes the motor through conductors 126 and 127.

Motor 33 is connected to power leads 74 and 75 through conductors 130 and 131. As stated previously, the mechanical output 34 from motor 33 controls the movement of wiper arm 35 along potentiometer 36. Potentiometer 36 is energized from a transformer 132 having a primary 133 which is energized from power leads 74 and 75 through conductors 134 and 135. Transformer 132 also has a secondary 136 across which potentiometer 36 is connected. The lower terminal of potentiometer 36 is connected to ground terminal 137.

The mechanical output 34 of motor 33 may also move an indicator arm 140 across a dial 141 to indicate the total quantity of fuel remaining in all of the tanks.

The output voltage of potentiometer 36 is connected to amplifier 70 through conductor 142, summing resistor 67 and conductor 143. The output voltage of potentiometer 36 is also sent back to the input circuit of amplifier 32 through conductor 142, summing resistor 37, and conductors 144, 122 and 117. This circuit from potentiometer 36 to the input circuit of amplifier 32 is a rebalancing circuit with the output voltage from potentiometer 36 being of such polarity as to oppose the voltages from potentiometers 17 and 27 and reduce the input voltage to amplifier 32 to zero when the voltages from both potentiometers 17 and 27 cease changing.

The fuel from tank 22 flows to the aircraft engine through a pipe 145. The flowmeter 46 which provides an output voltage indicative of the change of the rate of flow of the fuel from the tank is shown here as comprising a voltage divider obtaining its energizing voltage from a transformer 146 having a primary 147. Transformer primary 147 is connected to power leads 74 and 75 by the following circuit: from power lead 74 through conductors 107 and 150, transformer primary 147, and conductors 151 and 110 back to power lead 75. Transformer 146 also has a secondary 152 which has a center tap 153.

A pair of temperature-sensitive resistors 154 and 155 are wrapped about pipe 145 with resistor 155 wrapped around the pipe a distance downstream from resistor 154. The right-hand terminal of resistor 154 is connected to the left-hand terminal of resistor 155 with the two terminals then connected to a ground terminal 156 by means of a conductor 157. The left-hand terminal of resistor 154 is connected to the left-hand terminal of transformer secondary 152 through a variable resistor 160 having a wiper arm 161 cooperating therewith. The right-hand terminal of resistor 155 is connected to the right-hand terminal of transformer secondary 152 by means of conductor 162.

When the resistances of resistors 154 and 155 are equal and wiper arm 161 is at the upper end of variable resistor 160, the center tap 153 of transformer secondary 152 is at ground potential and there is no output voltage across center tap 153 and ground terminal 156. The center tap 153 and ground terminal 156 are connected into the input circuit of amplifier 47 to control the energization of the amplifier. A heating coil 163 is wound about the pipe 145 between resistor coils 154 and 155. This heating coil is energized from a transformer 164 having a primary 165 connected to power leads 74 and 75 by the following circuit: from power lead 74 through conductors 107 and 166, transformer primary 165, and conductors 167 and 110 back to power lead 75. Transformer 164 also has a secondary 170 to which the heating coil 163 is connected for energization of the coil.

In the type of flowmeter here shown, the heating coil 163 is energized a constant amount at all times with the heat being dissipated through the pipe 145 to the fuel flowing within the pipe. This heat dissipated from heating coil 163 is carried downstream by the fuel and heats temperature-sensitive resistor 155. As the resistance of resistor 155 changes with its temperature, the voltage drop across resistors 154 and 155 changes so that the voltage drops across the two resistors are no longer equal; this results in center tap 153 of transformer secondary 152 no longer being at ground potential. Thus, there is a signal output voltage from the flowmeter to amplifier 47.

Amplifier 47 is energized from power lead 74 through conductors 107, 150 and 171, amplifier 47 and conductors 172, 151 and 110 back to power lead 75. Amplifier 47 is connected to motor 50 by conductors 173 and 174 to control the energization of motor 50. Motor 50 is connected to power leads 74 and 75 by the following circuit: from power lead 74 through conductors 107, 150 and 168, motor 50, and conductors 169, 151 and 110 back to power lead 75. The mechanical output 51 of motor 50 operates wiper arm 52 along potentiometer 53. Potentiometer 53 is connected to a transformer 175 which has a primary 176 connected to the power leads 74 and 75 by the following circuit: from power lead 74 through conductor 107, transformer primary 176, and conductor 110 back to power lead 75. Transformer 175 also has a secondary 177 across which potentiometer 53 is connected. The lower terminal of potentiometer 53 is connected to ground terminal 180.

The mechanical output 51 of motor 50 is also connected to the wiper arm 161 which cooperates with resistor 160 to vary the resistance of the portion of the voltage divider between the left-hand terminal of transformer secondary 152 and ground to cause it to equal the resistance of resistor 155 and thus rebalance the circuit and place center tap 153 of secondary 152 at ground potential and thus reduce the output voltage of the flowmeter to amplifier 47 to zero. It is seen that amplifier 47 and motor 50 are energized only when the rate of flow of the fuel through pipe 145 is changing and thus the output voltage from potentiometer 53 is an indication of the instantaneous rate of fuel flow through the pipe 145.

The output voltage of potentiometer 53 with respect to ground terminal 180 is connected to amplifier 56 through wiper 52, conductor 181, summing resistor 55 and conductor 182 to amplifier 56. The other input terminal to amplifier 56 is connected to ground terminal 183.

As the circuit comprising flowmeter 40, amplifier 41, motor 42 and the potentiometer 45 is identical in construction and operation with the circuit of flowmeter 46, amplifier 47, motor 50 and potentiometer 53, it need not be discussed. The output voltage from potentiometer 45 is connected to amplifier 56 through conductor 184, summing resistor 54, and conductors 185, 186 and 182 to amplifier 56.

Amplifier 56 is energized from power leads 74 and 75 by the following circuit: from power lead 74 through conductors 107, 187 and 190, amplifier 56, and conductors 192, 193 and 110 to power lead 75.

Amplifier 56 is connected to motor 57 by conductors 194 and 195 to control the energization of motor 57. Motor 57 is connected to power leads 74 and 75 by the following circuit: from power lead 74 through conductors 107, 187, and 188, motor 57, and conductors 189, 193 and 110 to power lead 75.

As stated previously, motor 57 controls the movement of wiper arm 61 along potentiometer 62 by means of a mechanical connection 60. Potentiometer 62 is energized by a transformer 196 having a primary 197 which is energized by power leads 74 and 75 by the following circuit: from power lead 74 through conductors 107 and 187, transformer primary 197 and conductors 193 and 110 back to power lead 75. Transformer 196 also has a secondary 200 to which potentiometer 62 is connected for energization. The lower terminal of potentiometer 62 is connected to a ground terminal 201.

The output voltage of potentiometer 62 is connected to the input circuit of amplifier 56 for rebalancing purposes by the following circuit: from wiper arm 61 through conductors 202 and 203, summing resistor 63, and conductors 204, 186 and 182 to the input circuit of the amplifier. Thus, when the output voltage of the potentiometer 62 properly represents the total rate of fuel flow from the tanks, the input voltage to the amplifier is balanced out, the amplifier is not energized, and the motor does not operate.

The output voltage of potentiometer 62 with respect to ground terminal 201 is also impressed across potentiometer 64 through conductors 202 and 205 to the upper terminal of potentiometer 64. The lower terminal of potentiometer 64 is connected to ground terminal 206. It is seen that the voltage across potentiometer 64 is the voltage which is indicative of the total instantaneous rate of fuel flow from the various tanks.

The output voltage from potentiometer 64 is compared with the output voltage indicative of the total quantity of fuel remaining in the tank. As previously explained, the voltage indicative of the total quantity of fuel in the tank is the output voltage of potentiometer 36, which is impressed on the input circuit of amplifier 70 through wiper 35, conductor 142, summing resistor 67, and conductor 143 to the input circuit of amplifier 70. The other input terminal of amplifier 70 is connected to ground terminal 207. The output voltage of potentiometer 64 is impressed on the input circuit of amplifier 70 from wiper 65 through summing resistor 66, and conductor 143. The two voltages summed into amplifier 70 are of opposite polarity so that when both have the same magnitude, the net input voltage into amplifier 70 is zero. When there is a potential difference between the two voltages impressed on the input circuit of the amplifier 70, the amplifier is energized. The amplifier receives its power supply voltage from power leads 74 and 75 through conductors 210 and 211.

Amplifier 70 is connected to motor 71 through conductors 212 and 213 to control the operation of motor 71. Motor 71 is connected to power leads 74 and 75 through conductors 214 and 215. Energization of amplifier 70 results in operation of motor 71 to cause mechanical connection 72 to move wiper arm 65 on potentiometer 64 to control the amount of voltage picked off potentiometer 64 to be compared with the voltage indicative of the total quantity of fuel.

Potentiometer 64 may be known as the time potentiometer and the portion of the voltage with respect to ground terminal 206 across the potentiometer picked off by wiper arm 65 may be represented by T. The total voltage across the potentiometer 64 is indicative of the instantaneous total rate of flow of the fuel and may be represented as $$\frac{dq}{dt}$$

Therefore, the voltage on wiper arm 65 impressed on the input circuit of amplifier 70 wound be a voltage proportional to both $$\frac{dq}{dt} \text{ and } T \text{ or } \frac{dq}{dt}T$$

The voltage picked off potentiometer 36 by wiper arm 35 is indicative of the total quantity of fuel in all the tanks and may be represented by Q. This voltage is compared with the voltage $$\frac{dq}{dt}T$$

in the input circuit of the amplifier 70 and it is apparent that when the two voltages are equal, and since they are of opposite polarity as described, the equation $$Q = \frac{dq}{dt}T$$

is satisfied and the factor T, which is indicated on indicator dial 73, is the time the fuel will last if it continues to be used at the present rate.

Motor 71, as previously stated, may also move a pointer on a dial 73 to indicate visually the length of time the fuel will last if it continues to be used up at the present rate.

Figure 2:
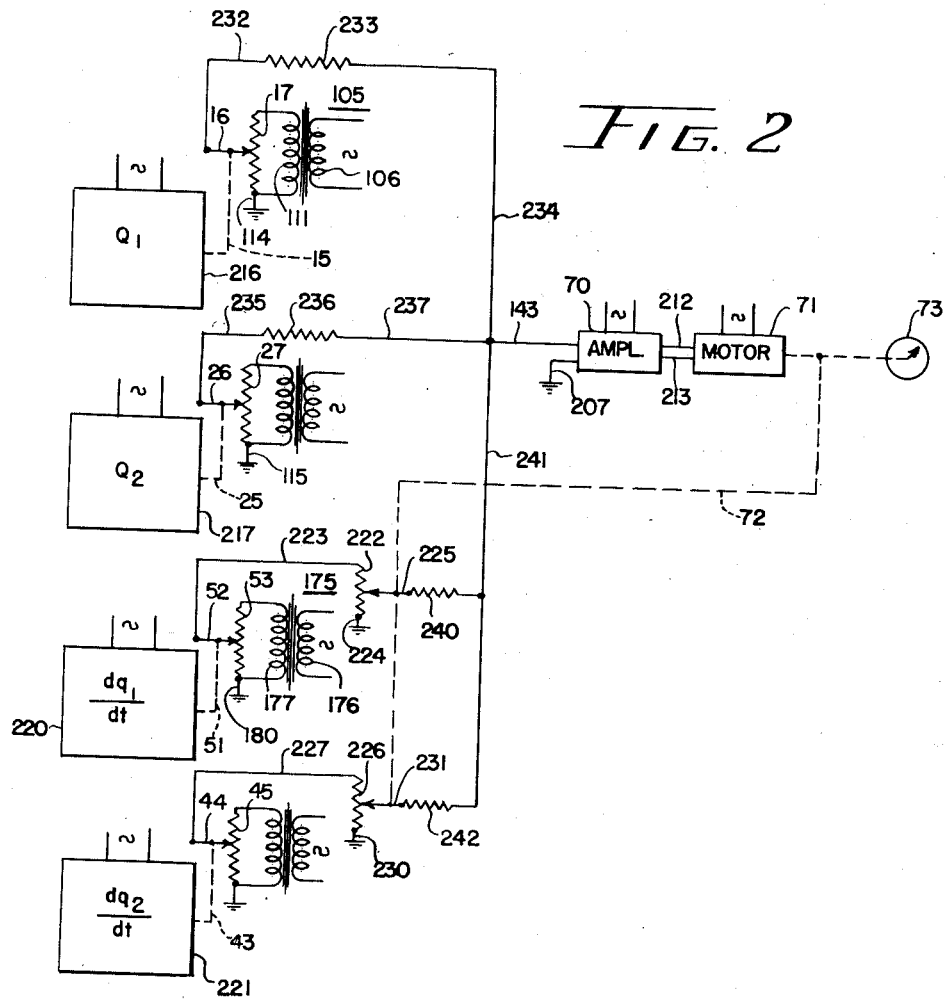
Figure 2 is an illustration of a slightly modified use of the invention.

Modification of Figure 2

In Figure 2, a number of the various components have been grouped together for simplicity and for understanding the difference between the species of Figures 1 and 2. In Figure 2, the box 216 represents apparatus corresponding to the bridge 10, amplifier 13 and motor 14 of the circuit of Figure 1. The mechanical rebalancing connection 15 is also internal and so is not shown. The mechanical output from this circuit to the wiper arm 16 on potentiometer 17 has been shown and is designated 15 as in Figure 1.

The box 217 represents the bridge 20, amplifier 23 and motor 24 of the circuit of Figure 1, but shows the mechanical connection 25 to the wiper arm 26 moving along potentiometer 27.

The box 220 represents the flowmeter 46, amplifier 47 and motor 50 of the circuit of Figure 1 with the mechanical connection 51 from the motor to the wiper arm 52 of potentiometer 53 being shown. The box 221 represents the flowmeter 40, amplifier 41 and motor 42 of the circuit of Figure 1 with the mechanical connection 43 from the motor to the wiper arm 44 on potentiometer 45 being shown.

The output voltage of potentiometer 53 is impressed across a potentiometer 222 through conductor 223. The other terminal of potentiometer 222 is connected to ground terminal 224. A wiper arm 225 cooperates with potentiometer 222.

The output voltage of potentiometer 45 is connected across a potentiometer 226 through conductor 227. The lower terminal of potentiometer 226 is shown to be connected to a ground terminal 230. A wiper arm 231 cooperates with potentiometer 226.

In the circuit of Figure 2 rather than the separate fuel quantity signals being added together to produce one total fuel quantity signal and the various rate of fuel flow signals being added together to produce one total rate of fuel flow signal, as is done in the circuit of Figure 1, the individual fuel quantity signals, and the individual rate of fuel flow signals each multiplied by the time proportions, are added together and introduced into the input circuit of amplifier 70. The circuits are as follows: the fuel quantity signal voltage from potentiometer 17 is impressed on the input circuit of amplifier 70 through conductor 232, summing resistor 233, and conductors 234 and 143; the fuel quantity signal voltage from potentiometer 27 is impressed on the input circuit of the amplifier through conductor 235, summing resistor 236 and conductors 237 and 143; the rate of fuel flow modified by the portion picked off from potentiometer 222 by wiper arm 225 is impressed on the input circuit of the amplifier through summing resistor 240 and conductors 241 and 143; and the rate of fuel flow modified by the portion picked off from potentiometer 226 by wiper arm 231 is impressed on the input circuit of the amplifier through resistor 242 and conductors 241 and 143.

Potentiometers 222 and 226 may be known as the time potentiometers and the portions of the voltages picked off these potentiometers by wiper arms 225 and 231, respectively, may be represented by T. As these wiper arms are moved in unison by motor 71 the same portions of the voltages are picked off and therefore the same term T may be used for both portions. The voltages across potentiometer 222 and 226 are indicative of the instantaneous rates of fuel flow as measured by the two flowmeters and may be represented as $$\frac{dq_1}{dt} \text{ and } \frac{dq_2}{dt}$$

Therefore, the voltages on wiper arms 225 and 231, which are added together and impressed on the input circuit of amplifier 70 would be $$\left(\frac{dq_1}{dt}T + \frac{dq_2}{dt}T\right)$$

The voltages picked off by wiper arms 16 and 26 from potentiometers 17 and 27 are indicative of the quantities of the fuel in the various tanks and may be represented by $Q_1$ and $Q_2$. These voltages are added together and impressed on the input circuit of amplifier 70 as $(Q_1+Q_2)$. The $(Q_1+Q_2)$ and $$\left(\frac{dq_1}{dt}T + \frac{dq_2}{dt}T\right)$$

voltages are compared in the input circuit of the amplifier and when they are equal, it is obvious that the equation $$(Q_1+Q_2) = \left(\frac{dq_1}{dt}T + \frac{dq_2}{dt}T\right)$$

is satisfied and the factor T, which is indicated on indicator dial 73, is the time the fuel will last if it continues to be used at the present rate.

The amplifier 70 controls the operation of motor 71 to control the mechanical connection 72 connected to both wiper arms 225 and 231 cooperating with potentiometers 222 and 226 respectively. The mechanical connection 72 also operates the indicator arm on dial 73 to indicate the time the fuel will last if it continues to be used at the present rate, just as is done in the circuit of Figure 1.

It can be seen that by the use of the circuit shown in Figure 2 rather than the circuit of Figure 1 two fewer amplifiers and two less motors may be used and only one additional potentiometer is needed. If more than two fuel quantity signals and more than two rate of fuel flow signals were obtained, more time potentiometers would be needed but that the savings in amplifiers and motors would remain at two of each.

It is apparent that by using the circuit of Figure 2, it would not be possible to obtain a visual indication on a dial of the total amount of fuel remaining or the total rate of fuel flow but that visual indication of the individual quantities of fuel or rates could still be had if desired.

It can be seen that a circuit for obtaining an indication of the time of duration fuel will last has been devised in two manners; one by adding all the fuel quantity signals together and the rate of fuel flow signals together and then comparing the total fuel quantity signal with a portion of the total rate of fuel flow signal, and the other by comparing all the individual fuel quantity signals with portions of all the individual rate of fuel flow signals.

It is to be understood that various modifications may be made by those skilled in the art within the spirit of the invention and that the scope of this invention is intended to be limited only to the extent of the appended claims.

I claim as my invention:

1. Fuel duration indicator apparatus comprising, in combination: first bridge means having as one arm thereof a sensing element the signal from which varies with the quantity of fuel in a tank; first motor means; means connecting said first motor means to said first bridge means to control the operation of said first motor means; a first potentiometer connected to said first motor means to vary the output voltage of said first potentiometer upon operation of said first motor means and derive a first output voltage from said first potentiometer which is a function of the quantity of fuel in the tank; second bridge means measuring the rate of change of the fuel in the tank and deriving a second voltage which is a function of the rate of change; a second potentiometer connected to said second bridge means to cause the second voltage to be impressed across said second potentiometer; signal amplification means comparing the first voltage with a portion of the second voltage; second motor means; means connecting said second motor means to said signal amplification means to control the operation of said second motor means; means connecting said second motor means to said second potentiometer to vary the compared portion of the second voltage until the compared portion of the second voltage is equal to the first voltage; and indicating means connected to said second motor means and operated by said second motor means to give an indication of the length of time the fuel would last if it were to continue to leave the tank at the present rate.

2. Fuel duration indicator apparatus comprising, in combination: a first plurality of bridge means, each having as one arm thereof a sensing element, the signal from which varies with the quantity of fuel in a tank; a first plurality of motor means; means connecting said first plurality of motor means to said first plurality of bridge means to control the operation of the various motor means by the associated bridge means; a first plurality of potentiometers connected to said first plurality of motor means to vary the output voltages of the various potentiometers upon operation of the associated motor means and derive a first plurality of output voltages which are functions of the quantities of fuel in the tanks; a second plurality of bridge means measuring the rates of change of the quantities of fuel in the tanks and deriving a second plurality of voltages which are functions of the rates of change; a second plurality of potentiometers connected to said second plurality of bridge means to cause the second plurality of voltages to be impressed across the associated potentiometers; signal amplification means comparing the first plurality of voltages with portions of the second plurality of voltages; second motor means; means connecting said second motor means to said signal amplification means to control the operation of said second motor means; means connecting said second motor means to said second plurality of potentiometers to vary the compared portions of the second plurality of voltages until the compared portions are equal to the first plurality of voltages; and indicating means connected to said second motor means and operated by said second motor means to give an indication of the length of time the fuel would last if it were to continue to leave the tanks at the present rates.

3. Fuel duration indicator apparatus comprising, in combination: a first plurality of bridge means, each having as one arm thereof a sensing element, the signal from which varies with the quantity of fuel in a tank; a first plurality of motor means; means connecting said first plurality of motor means to said first plurality of bridge means to control the operation of the various motor means by the associated bridge means; a first plurality of potentiometers connected to said first plurality of motor means to vary the output voltages of the various potentiometers upon operation of the associated motor means and derive a first plurality of output voltages which are functions of the quantities of fuel in the tanks; first summing means adding the first plurality of voltages; second motor means; means connecting said second motor means to said first summing means to control the operation of said second motor means; a second potentiometer connected to said second motor means to vary the output voltage of said second potentiometer upon operation of said second motor means to derive a first totalizing voltage which is a function of the total quantity of fuel in the tanks; a second plurality of bridge means measuring the rates of change of the quantities of fuel in the tanks and deriving a second plurality of voltages which are functions of the rates of change; second summing means adding the second plurality of voltages; third motor means; means connecting said third motor means to said second summing means to control the operation of said third motor means; a third potentiometer connected to said third motor means to vary the output voltage of said third potentiometer upon operation of said third motor means to derive a second totalizing voltage which is a function of the total rate of change of the quantities of fuel in the tanks; signal amplification means comparing the first totalizing voltage with a portion of the second totalizing voltage; fourth motor means; means connecting said fourth motor means to said signal amplification means to control the operation of said fourth motor means; means connecting said fourth motor means to said third potentiometer to vary the compared portion of the second totalizing voltage until the compared portion is equal to the first totalizing voltage; and indicating means connected to said fourth motor means and operated by said fourth motor means to give an indication of the length of time the fuel would last if it were to continue to leave the tanks at the present total rate.

4. Fuel duration indicator apparatus comprising, in combination: first bridge means having as one arm thereof a sensing element, the signal from which varies with the quantity of fuel in a tank, said first bridge means deriving a first voltage which is a function of the fuel quantity; second bridge means measuring the rate of change of the fuel in the tank and deriving a second voltage which is a function of the rate of change; a potentiometer connected to said second bridge means to cause the second voltage to be impressed across said potentiometer; signal amplification means comparing the first voltage with a portion of the second voltage; motor means; means connecting said motor means to said signal amplification means to control the operation of said motor means; means connecting said motor means to said potentiometer to vary the compared portion of the second voltage until the compared portion of the second voltage is equal to the first voltage; and indicating means connected to said motor means and operated by said motor means to give an indication of the length of time the fuel would last if it were to continue to leave the tank at the present rate.

5. Fuel duration indicator apparatus comprising, in combination: a first plurality of bridge means, each having as one arm thereof a sensing element, the signal from which varies with the quantity of fuel in a tank, said first plurality of bridge means deriving a first plurality of output voltages which are functions of the quantities of fuel in the tanks; a second plurality of bridge means measuring the rates of change of the quantities of fuel in the tanks and deriving a second plurality of voltages which are functions of the rates of change; a plurality of potentiometers connected to said second plurality of bridge means to cause the second plurality of voltages to be impressed across the associated potentiometers; signal amplification means comparing the first plurality of voltages with portions of the second plurality of voltages; motor means; means connecting said motor means to said signal amplification means to control the operation of said motor means; means connecting said motor means to said plurality of potentiometers to vary the compared portions of the second plurality of voltages until the compared portions are equal to the first plurality of voltages; and indicating means connected to said motor means and operated by said motor means to give an indication of the length of time the fuel would last if it were to continue to leave the tanks at the present rates.

6. Fuel duration indicator apparatus comprising in combination: a first plurality of bridge means, each having as one arm thereof a sensing element, the signal from which varies with the quantity of fuel in a tank, said first plurality of bridge means deriving a first plurality of output voltages which are functions of the quantities of fuel in the tanks; first summing means adding the first plurality of voltages to derive a first totalizing voltage which is a function of the total quantity of fuel in the tanks; a second plurality of bridge means measuring the rates of change of the quantities of fuel in the tanks and deriving a second plurality of voltages which are functions of the rates of change; second summing means adding the second plurality of voltages to derive a second totalizing voltage which is a function of the total rate of change of the quantities of fuel in the tanks; a potentiometer connected to said second summing means such that the second totalizing voltage is impressed across the potentiometer; signal amplification means comparing the first totalizing voltage with a portion of the second totalizing voltage; motor means; means connecting said motor means to said signal amplification means to control the operation of said motor means; means connecting said motor means to said potentiometer to vary the compared portion of the second totalizing voltage until the compared portion is equal to the first totalizing voltage; and indicating means connected to said motor means and operated by said motor means to give an indication of the length of time the fuel would last if it were to continue to leave the tanks at the present total rate.

7. Fuel duration indicator apparatus comprising, in combination: first bridge means having as one arm thereof a sensing element, the signal from which varies with the quantity of fuel in a tank, said first bridge means deriving a first voltage which is a function of the fuel quantity; second bridge means measuring the rate of change of the fuel in the tank and deriving a second voltage which is a function of the rate of change; comparing means comparing one of said voltages with a portion of the other of said voltages; motor means; means connecting said motor means to said comparing means to control the operation of said motor means; means operated by said motor means for varying the compared portion of said other voltage until the compared portion is equal to said one voltage; and indicating means connected to said motor means and operated by said motor means to give an indication of the length of time the fuel would last if it were to continue to leave the tank at the present rate.

8. Fuel duration indicator apparatus comprising, in combination: a first plurality of bridge means, each having as one arm thereof a sensing element, the signal from which varies with the quantity of fuel in a tank, said first plurality of bridge means deriving a first plurality of output voltages which are functions of the quantities of fuel in the tanks; a second plurality of bridge means measuring the rates of change of the quantities of fuel in the tanks and deriving a second plurality of voltages which are functions of the rates of change; comparing means comparing one plurality of said voltages with portions of the other plurality of said voltages; motor means; means connecting said motor means to said comparing means to control the operation of said motor means; means operated by said motor means for varying the compared portions of said other plurality of voltages until the compared portions are equal to said one plurality of voltages; and indicating means connected to said motor means and operated by said motor means to give an indication of the length of time the fuel would last if it were to continue to leave the tanks at the present rate.

9. Fuel duration indicator apparatus comprising in combination: a first plurality of bridge means, each having as one arm thereof a sensing element, the signal from which varies with the quantity of fuel in a tank, said first plurality of bridge means deriving a first plurality of output voltages which are functions of the quantities of fuel in the tanks, first summing means adding the first plurality of voltages to derive a first totalizing voltage which is a function of the total quantity of fuel in the tanks; a second plurality of bridge means measuring the rates of change of the quantities of fuel in the tanks and deriving a second plurality of voltages which are functions of the rates of change; second summing means adding the second plurality of voltages to derive a second totalizing voltage which is a function of the total rate of change of the quantities of fuel in the tanks; comparing means comparing one of said totalizing voltages with a portion of the other of said totalizing voltages; motor means; means connecting said motor means to said comparing means to control the operation of said motor means; means operated by said motor means for varying the compared portion of said other totalizing voltage until the compared portion is equal to said one totalizing voltage; and indicating means connected to said motor means and operated by said motor means to give an indication of the length of time the fuel would last if it were to continue to leave the tanks at the present total rate.

10. Fuel duration indicator apparatus comprising, in combination: first sensing means responsive to the quantity of fuel in a tank and deriving a first signal indicative of the quantity of fuel in the tank; second sensing means responsive to the rate of change of the quantity of fuel in the tank and deriving a second signal indicative of the rate of change of the quantity of fuel in the tank; comparing means comparing one of said signals with a portion of the other of said signals; motor means; means connecting said comparing means to said motor means and controlling the operation of said motor means; and means operated by said motor means controlling the compared portion of said other signal and adjusting the compared portion until it is equal to said one signal, the portion of said other signal being compared being an indication of the time of duration of the fuel.

11. Fuel duration indicator apparatus comprising, in combination: a first plurality of sensing means responsive to the quantities of fuel in a plurality of tanks and deriving a first plurality of signals indicative of the quantities of fuel in the tanks; a second plurality of sensing means responsive to the rates of change of the quantities of fuel in the tanks and deriving a second plurality of signals indicative of the rates of change of the quantities of fuel in the tanks; comparing means comparing one of said plurality of signals with portions of the other of said plurality of signals; motor means; means connecting said comparing means to said motor means and controlling the operation of said motor means; and means operated by said motor means controlling the compared portions of said other plurality of signals and adjusting the compared portions until they are equal to said one plurality of signals, the portions of said other plurality of signals being compared being an indication of the time of duration of the fuel.

12. Fuel duration indicator apparatus comprising, in combination: a first plurality of sensing means responsive to the quantities of fuel in a plurality of tanks and deriving a first plurality of signals indicative of the quantities of fuel in the tanks; first summing means adding the first plurality of signals and deriving a first totalizing signal which is indicative of the total quantity of fuel in the tanks; a second plurality of sensing means responsive to the rates of change of the quantities of fuel in the tanks and deriving a second plurality of signals indicative of the rates of change of the quantities of fuel in the tanks; second summing means adding the second plurality of signals and deriving a second totalizing signal which is indicative of the total rate of change of the quantity of fuel in the tanks; comparing means comparing one of said totalizing signals with a portion of said other totalizing signal; motor means; means connecting said comparing means to said motor means and controlling the operation of said motor means; and means operated by said motor means controlling the compared portion of said other totalizing signal and adjusting the compared portion until it is equal to said one totalizing signal, the portion of said other totalizing signal being compared being an indication of the time of duration of the fuel.

13. Fuel duration indicator apparatus comprising, in combination: capacitive type sensing means positioned in a tank and responsive to the quantity of fuel in the tank to change the capacitance of said sensing means and derive a first signal indicative of the quantity of fuel in the tank; second signal producing means deriving a second signal indicative of the rate of change of the quantity of fuel in the tank; comparing means comparing one of said signals with a portion of the other of said signals; motor means; means connecting said comparing means to said motor means and controlling the operation of said motor means; and means operated by said motor means controlling the compared portion of said other signal and adjusting the compared portion until it is equal to said one signal, the portion of said other signal being compared being an indication of the time of duration of the fuel.

14. Fuel duration indicator apparatus comprising, in combination: a plurality of capacitive type sensing means positioned in tanks and responsive to the quantities of fuel in the tanks to change the capacitances of said sensing means and derive a first plurality of signals indicative of the quantities of fuel in the tanks; summing means adding the first plurality of signals and deriving a first totalizing signal which is indicative of the total quantity of fuel in the tanks; second signal producing means deriving a second signal indicative of the rate of change of the quantity of fuel in the tanks; comparing means comparing one of said total signals with a portion of said other total signal; motor means; means connecting said comparing means to said motor means and controlling the operation of said motor means; and means operated by said motor means controlling the compared portion of said other total signal and adjusting the compared portion until it is equal to said one total signal, the portion of said other total signal being compared being an indication of the time of duration of the fuel.

KIMBALL C. CUMMINGS.

References Cited in the file of this patent

UNITED STATES PATENTS

| Number | Name | Date |
| --- | --- | --- |
| 1,533,530 | Wheatley et al. | Apr. 14, 1925 |
| 2,217,639 | Luhrs | Oct. 8, 1940 |
| 2,449,072 | Houghton | Sept. 14, 1948 |
| 2,454,520 | Moore | Nov. 23, 1948 |
| 2,468,179 | Darlington et al. | Apr. 26, 1949 |
| 2,476,747 | Lovell | July 19, 1949 |
| 2,478,720 | Sourwine et al. | Aug. 9, 1949 |
| 2,503,387 | Hartwig | Apr. 11, 1950 |
| 2,511,614 | Agins et al. | June 13, 1950 |
| 2,537,498 | Wickesser | Jan. 9, 1951 |
| 2,581,205 | Reilly | Jan. 1, 1952 |

OTHER REFERENCES

"Electronics," August 1946; Electronic Computers by William Shamon; pages 110–113.